Oct. 12, 1965  R. K. LIESS  3,210,868
EARTHMOVING SCRAPER WITH AUXILIARY BOWL MOUNTED CONVEYOR
Filed March 25, 1963  3 Sheets-Sheet 1

INVENTOR.
RICHARD K. LIESS
BY
*Fryer and Zinswold*
ATTORNEYS

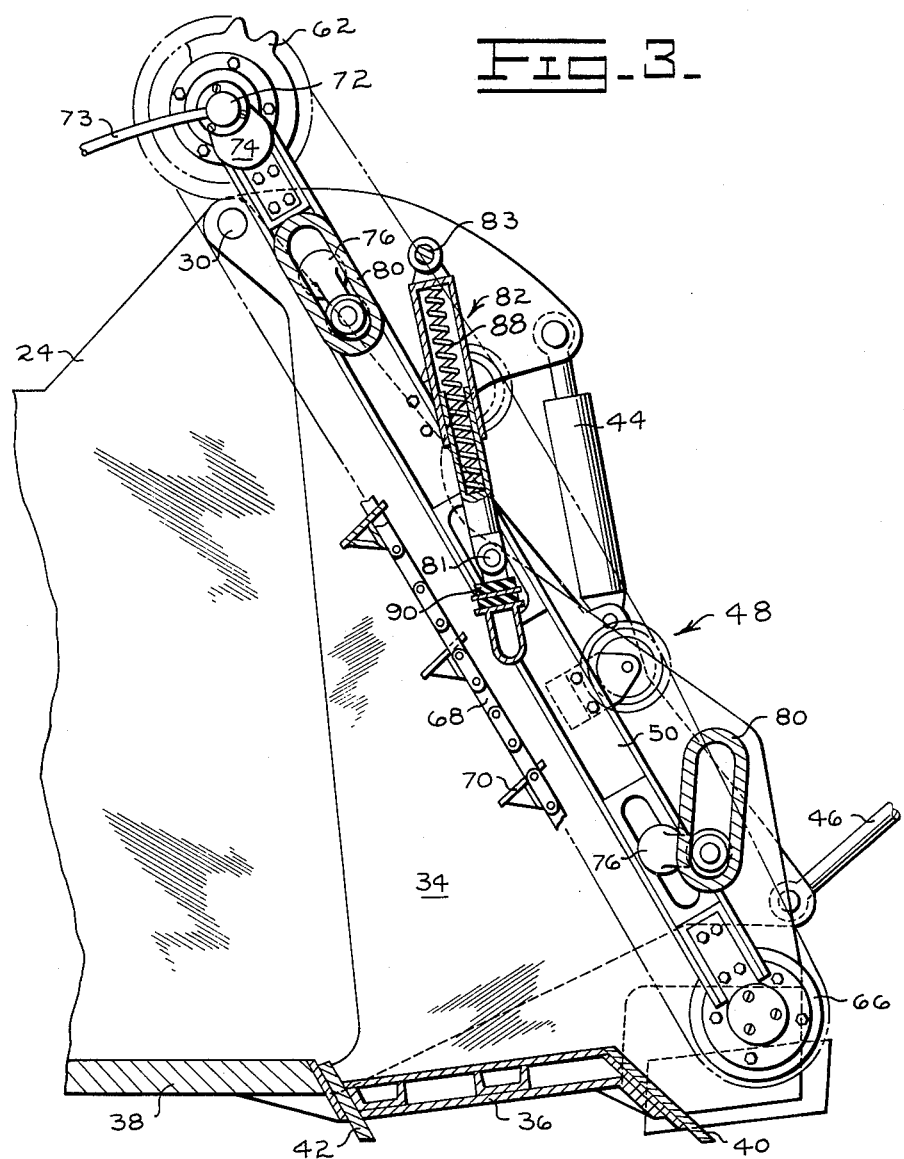

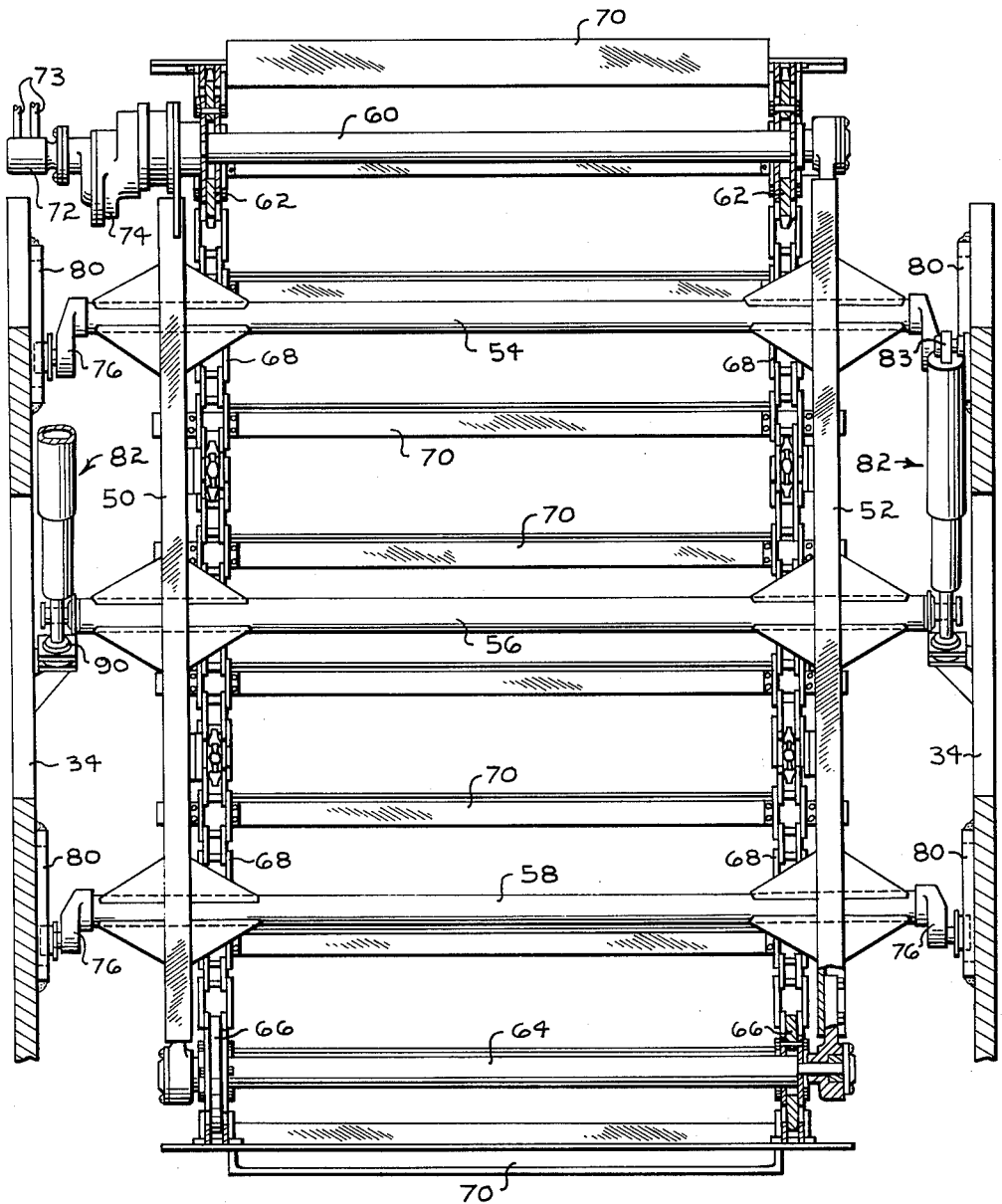

United States Patent Office 3,210,868
Patented Oct. 12, 1965

3,210,868
EARTHMOVING SCRAPER WITH AUXILIARY
BOWL MOUNTED CONVEYOR
Richard Kenneth Liess, Joliet, Ill., assignor to Caterpillar Tractor Co., Peoria, Ill., a corporation of California
Filed Mar. 25, 1963, Ser. No. 267,465
2 Claims. (Cl. 37—8)

The present invention relates to self-loading scrapers wherein a conveyor mounted in an auxiliary bowl assists in the loading operation.

In conventional self-loading scrapers of this type, a scraper bowl is provided at its open front with a conveyor. The conveyor is operated in a manner to urge material being excavated between the bottom of the conveyor and the cutting edge on the lower front edge of the bowl, thereby expediting the loading operation. Since large rocks and other material, not having been previously broken, would tend to damage the conveyor as they are forced into the bowl, a relatively complicated floating mechanism must be provided for the conveyor. The floating mount is further complicated by the fact that the conveyor must be capable of being raised or in some way removed from the front of the bowl whereby the load may be ejected.

In accordance with the present invention, an auxiliary bowl is pivoted within the open front of the main bowl providing transverse support. The auxiliary bowl is formed with a rearwardly extending bottom registering with the bottom of the main bowl whereby the two bottoms define a single bowl bottom during the loading operation. The leading edge of the bottom of the auxiliary bowl is formed with a cutting edge, and a conveyor or rotary element is floatably mounted in the auxiliary bowl above the cutting edge and urges material excavated rearwardly into the bowl. Means are provided for effecting up and down movement of the main bowl to engage the cutting edge on the auxiliary bowl with the ground, and means are provided for pivoting the auxiliary bowl forwardly and upwardly relative to the main bowl to permit forward movement of an ejector plate in the main bowl and ejection of a load. The sides of the main bowl extend forward of the pivotal axis of the auxiliary bowl to overlap the sides of the auxiliary bowl even when it is raised to the ejection position whereby material is not ejected from the sides of the main bowl. In this connection, the bottom of the auxiliary bowl is rearwardly and downwardly inclined to facilitate dumping of material from the auxiliary bowl upon raising it, and also aids in moving the material rearwardly during loading.

One object of the present invention is to provide a scraper of the type described wherein an auxiliary bowl pivoted in the open front of the main bowl floatably mounts a conveyor. This eliminates complicated linkages which would otherwise be required to raise the conveyor. Also the pivoted auxiliary bowl provides transverse support to the front of the main bowl.

Another object is to provide a scraper wherein a portion of the floor of the scraper bowl is carried by an auxiliary bowl. When the auxiliary bowl is raised to the ejection position, the floor of the main bowl is in effect shortened. This results in a shorter stroke for the ejector plate. In addition this reduces overall ejection forces by reducing the area of contact of the ejected material with the floor of the bowl. Complete dumping or unloading of material contained in the auxiliary bowl is assured because the floor of the auxiliary bowl is rearwardly and downwardly slanted.

Another object is to provide a scraper wherein the sides of the auxiliary and main bowls overlap to provide support for the auxiliary bowl when it is raised and also to prevent the auxiliary bowl from hanging on the forward edge of the main bowl as it is returned to loading position. The overlapping sides also prevent the load from being dumped from the sides of the bowls.

Another object of the invention is to provide a scraper with an auxiliary bowl which may be raised to permit loading of large rocks and logs which could not pass between the bottom of the conveyor and the cutting edge on the auxiliary bowl. The availability of down pressure on the auxiliary bowl provides a bull clam feature which may be used to lift large rocks and the like.

These and other objects will be appreciated upon reading the following written description with reference to the accompanying drawings wherein:

FIG. 3 is a fragmentary side elevation shown partially in section of one means for a float mounting for the conveyor; and FIG. 4 is a plan view partially in section of the conveyor.

Figure 1:
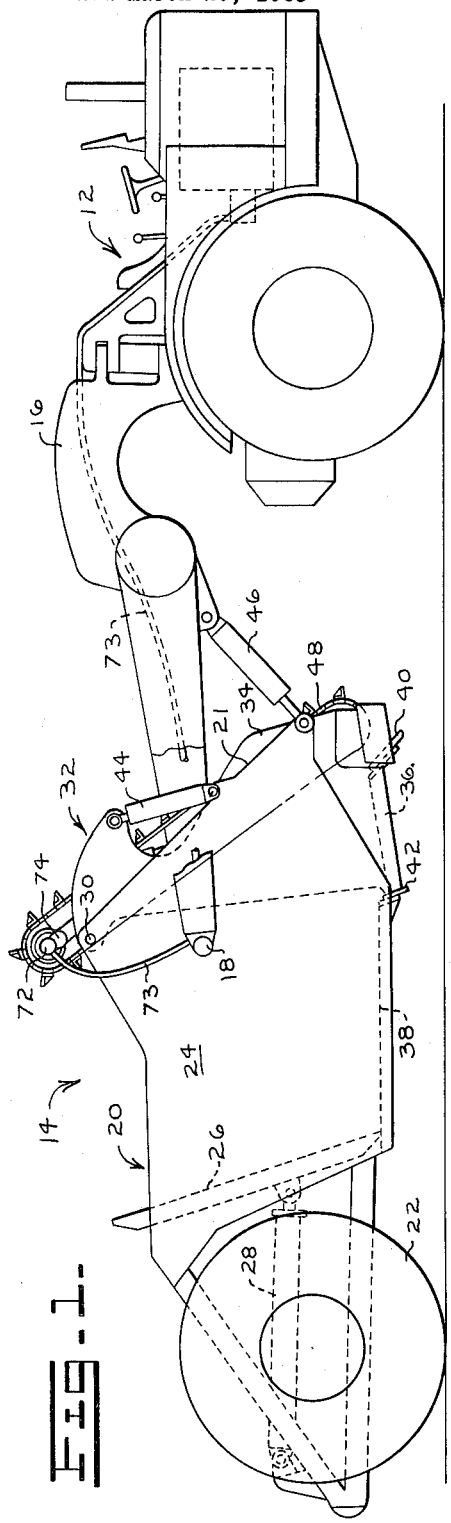
FIG. 1 is a side elevation of a tractor drawing a scraper embodying the present invention.

The drawings illustrate a tractor 12 attached to a scraper 14 by gooseneck 16 pivoted as at 18 to the scraper. The scraper includes a main bowl 20 supported at its rear by wheels 22.

Main bowl 20 is open at its front 21, and closed at its sides 24 and at its rear by ejector plate 26. A jack 28 is provided to actuate the ejector plate.

Pivoted as at 30 within the open front of the main bowl is an auxiliary bowl 32. The auxiliary bowl includes sides 34 and a rearwardly and downwardly extending bottom 36 which registers with the bottom 38 of the main bowl to define a single floor or bottom in the loading position. Bottom 36 of the auxiliary bowl is rearwardly and downwardly slanted to facilitate dumping. A cutting edge 40 is provided on the front edge of bottom 36 of the auxiliary bowl and a strike-off plate 42 is provided along the forward edge of bottom 38 of the main bowl.

Figure 2:
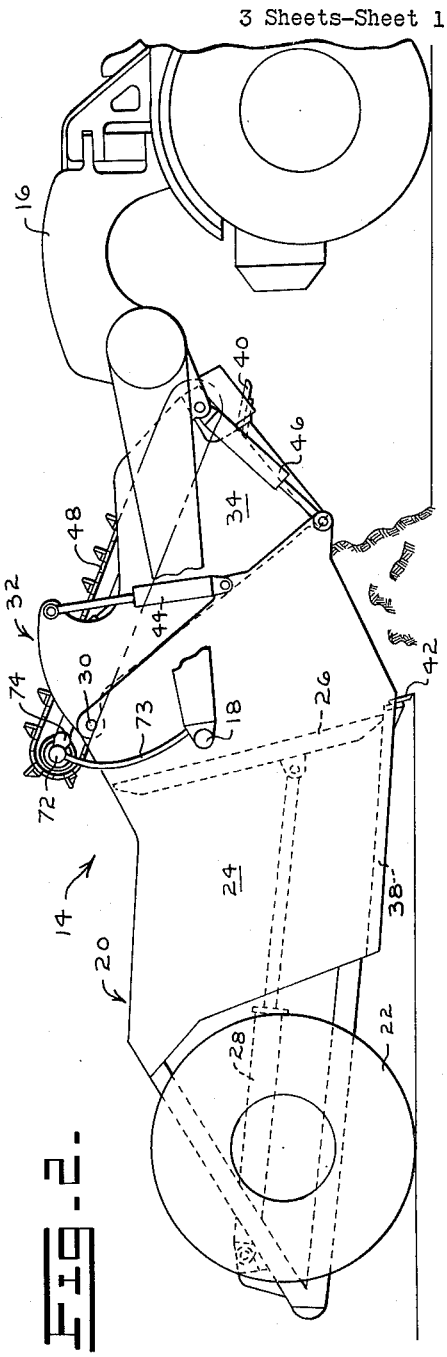
FIG. 2 is a view similar to FIG. 1 but showing the auxiliary bowl raised to the ejection position.

A pair of jacks, one shown at 44, extends between the sides 24 of the main bowl and sides 34 of the auxiliary bowl to lower and raise the auxiliary bowl to the load and eject positions of FIGS. 1 and 2. A second pair of jacks, one shown at 46, extending between side 24 of the main bowl and gooseneck 16 are operable to lower the scraper 14 such that cutting edge 40 is in the ground engaging position or to raise the scraper to a transport position.

A rearwardly and upwardly slanted conveyor 48 is carried within the open front of auxiliary bowl 32 and is operable in a clockwise direction as viewed in FIGS. 1–3 to urge material being excavated between the bottom of the conveyor and cutting edge 40 into the bowls.

As appears in FIGS. 3 and 4, the conveyor is provided with a frame including a pair of side rails 50 and 52 (FIG. 4) which are rigidly interconnected by a plurality of spreader tubes 54, 56 and 58. Side rails 50 and 52 rotatably support a cross tube 60 at the top of the conveyor which is provided with drive sprockets 62. A lower cross tube 64 is similarly rotatably supported at the bottom of the side rails and is provided with idlers 66 at its ends. Chains 68 are carried by sprockets 62 and idler 66 and are provided with a plurality of transverse angle irons 70 to form a continuous conveyor. An hydraulic motor 72 and a gear reduction mechanism 74 operate the conveyor through a power take off from the tractor schematically shown at 73 in FIG. 1.

Cross tubes 54 and 58 project outwardly beyond side rails 50 and 52 and are provided with offset members 76 at their ends which engage and carry the conveyor in elongated guide members 80 secured to the inner surfaces of sides 34 of the auxiliary bowl. This permits conveyor 48 to move or float relative to cutting edge 40 within the limits of guides 80 as large objects pass between the conveyor and cutting edge.

To supplement the weight of the conveyor and to maintain contact with the material flowing over the cutting edge, cross tube 56 extends beyond frame side rails 50 and 52 and pivotally supports (as at 81) the lower end of a spring package 82 which in turn is pivotally supported at its upper ends to the inside of the auxiliary bowl sides as indicated at 83. Spring package 82 comprises telescopic tubes and enclosing compression spring 88 to urge the conveyor downwardly toward the cutting edge. This downward movement is limited by a pair of resilient stops 90 secured to the sides of the auxiliary bowl which cushions downward movement of the elevator mechanism.

As shown in FIG. 1, auxiliary bowl 32 is in the down or load position. Jacks 46 are extended sufficiently to engage cutting edge 40 with the ground, power supplied to motor 72 to drive conveyor 48 in a clockwise manner and material excavated is pushed by the conveyor into the bowls. When the scraper has been loaded to capacity, jacks 46 are retracted sufficiently to transport the scraper to a dumping area, jacks 44 are extended to raise the auxiliary bowl to the dump position of FIG. 2 and jack 28 is extended, moving ejector blate 26 forwardly and ejecting material carried in the scraper. Strike off plate 42 may be employed to level and spread the dumped material.

Although the invention has been described in some detail for purposes of clarity, certain modifications may be practiced without departing from the spirit of the invention as limited only by the scope of the appended claims.

What is claimed is:

1. In a self-loading scraper including a main bowl open at its front, ejector means for urging material in the bowl forwardly toward the front opening, and a conveyor, the combination comprising;

an auxiliary bowl pivotally connected to the front of the main bowl for swinging movement relative thereto wherein said auxiliary bowl has a position in which it forms a continuous, forward, extension of the main bowl, the conveyor being secured to said auxiliary bowl for swinging movement therewith;

a cutting edge secured along the leading bottom edge of said auxiliary bowl only, whereby the scraper can be loaded only through said auxiliary bowl; and lift means secured between said auxiliary bowl and the main bowl, and operable to swing said auxiliary bowl forwardly relative to the main bowl thereby enabling material to pass between bottom edges of the two bowls.

2. In a self-loading scraper including a main bowl open at its front where the main bowl bottom terminates in a forward edge, an ejector for urging material in the bowl forwardly, and a conveyor, comprising in combination;

an auxiliary bowl having a bottom, and pivotally secured to the main bowl for swinging movement relative thereto, said auxiliary bowl having one position in which its bottom is disposed relative to the main bowl bottom so as to form a continuous forward extension thereof, said auxiliary bowl forming a forwardly extending extension to the main bowl when in the one position, the conveyor secured within said auxiliary bowl to swing therewith;

a cutting edge secured along the leading bottom edge of said auxiliary bowl only, whereby the scraper can be loaded only through said auxiliary bowl; and lift means disposed between the main bowl and said auxiliary bowl, and operable to urge said auxiliary bowl forwardly relative to the forward edge of the main bowl bottom whereby the bottoms of the bowls separate and enable the ejector to urge material out of the main bowl through the opening between the separated bowl bottoms, while the conveyor is swung up out of the way of the material being ejected.

References Cited by the Examiner

UNITED STATES PATENTS

| | | | |
|---|---|---|---|
| 2,164,461 | 7/39 | Le Bleu | 37—126 |
| 2,301,098 | 11/42 | Twyman | 60—97 |
| 2,791,041 | 5/57 | Hancock | 37—8 |
| 2,931,451 | 4/60 | Hancock | 180—14 |
| 2,994,976 | 8/61 | Hancock | 37—8 X |
| 3,049,819 | 8/62 | Cohron | 37—129 |
| 3,143,814 | 8/64 | Brinkmeyer | 37—8 |

BENJAMIN HERSH, *Primary Examiner.*